US008680222B2

(12) United States Patent  
Standaert et al.

(10) Patent No.: US 8,680,222 B2
(45) Date of Patent: Mar. 25, 2014

(54) CATALYST COMPOSITION FOR THE COPOLYMERIZATION OF PROPYLENE

(75) Inventors: Alain Standaert, Brussels (BE); Jerome Gromada, Waterloo (BE); David Vandewiele, Strepy-Bracquegnies (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 750 days.

(21) Appl. No.: 12/305,375

(22) PCT Filed: Jun. 21, 2007

(86) PCT No.: PCT/EP2007/056174
§ 371 (c)(1),
(2), (4) Date: Sep. 1, 2009

(87) PCT Pub. No.: WO2007/147865
PCT Pub. Date: Dec. 27, 2007

(65) Prior Publication Data
US 2009/0326172 A1    Dec. 31, 2009

(30) Foreign Application Priority Data
Jun. 21, 2006   (EP) .................................. 06115781

(51) Int. Cl.
C08F 2/00       (2006.01)
C08F 110/06     (2006.01)
C08F 4/02       (2006.01)

(52) U.S. Cl.
USPC ............ 526/213; 526/65; 526/209; 526/351; 502/125; 502/126; 502/127

(58) Field of Classification Search
USPC ............................................. 526/65; 502/103
See application file for complete search history.

(56) References Cited

U.S. PATENT DOCUMENTS

| 5,298,561 | A  | * | 3/1994 | Cecchin et al. | ............... | 525/240 |
| 6,323,150 | B1 |   | 11/2001 | Kojoh et al. | | |
| 6,503,993 | B1 | * | 1/2003 | Huovinen et al. | .......... | 526/348.1 |
| 6,723,829 | B1 | * | 4/2004 | Malm et al. | ................... | 528/481 |
| 6,818,583 | B1 | * | 11/2004 | Morini et al. | ................. | 502/103 |

FOREIGN PATENT DOCUMENTS

| CN | 1597714 A | 3/2005 |
| WO | 00/63261 A1 | 10/2000 |
| WO | WO 00/63261 | 10/2000 |

* cited by examiner

Primary Examiner — David Buttner
Assistant Examiner — Elizabeth Eng

(57) ABSTRACT

The present invention relates to a process for the production of propylene polymers in the presence of a Ziegler-Natta catalyst comprising a titanium compound having at least one titanium-halogen bond, and a blend of a diether compound and a succinate compound as internal electron donor, all supported on a magnesium halide in active form, an organoaluminium compound and an optional external donor.

18 Claims, No Drawings

CATALYST COMPOSITION FOR THE COPOLYMERIZATION OF PROPYLENE

CROSS-REFERENCE TO RELATED APPLICATIONS

This application claims the benefit of PCT/EP2007/056174, filed Jun. 21, 2007, which claims priority from EP 06115781.4, filed Jun. 21, 2006.

FIELD OF THE INVENTION

The present invention relates to the copolymerization of propylene with one or more comonomers in presence of a Ziegler-Natta catalyst comprising two different internal electron donors.

THE PRIOR ART AND THE TECHNICAL PROBLEM

Polypropylene has become one of the most widely used polymers due to its good combination of properties. Most of the polypropylene today is produced by polymerizing propylene and optionally one or more comonomers in presence of Ziegler-Natta catalysts, i.e. transition metal coordination catalysts, specifically titanium halide containing catalysts. Such catalysts also contain internal electron donors, with phthalates being the most widely used. Polypropylenes made with such catalysts have an acceptable balance of properties. To further improve, different catalyst compositions, and especially different internal electron donors have been developed and tested, and in some cases also commercialized.

WO 02/100904 discloses 1,3-diethers as internal electron donors, said diethers having the general formula $R^1R^2C(CH_2OR)_2$ with R being a $C_1$-$C_{10}$ alkyl group, $R^1$ being a linear or branched primary alkyl radical with at least three carbon atoms, and $R^2$ being a secondary alkyl or cycloalkyl radical, which is different from isopropyl. Both, $R^1$ and $R^2$ may optionally contain a heteroatom. The use of 1,3-diethers leads to polypropylenes with narrow molecular weight distribution and very high isotacticity.

WO 00/63261 discloses substituted succinates as internal electron donors. Polypropylenes made with a polymerization catalyst comprising a succinate as internal electron donor are characterized by a broad molecular weight distribution and high isotacticity.

While propylene polymers produced with diether or succinate compounds as internal electron donors have shown an improvement in properties over phthalates there are still some drawbacks. Propylene polymers produced in presence of a Ziegler-Natta catalyst with a diether compound as internal electron donor have acceptable mechanical properties but due to their narrow molecular weight distribution sometimes have limited processability. On the other hand, propylene polymers produced in presence of a Ziegler-Natta catalyst with a succinate compound as internal electron donor sometimes have processability problems due to their broad molecular weight distribution. They also require more effort in production.

Thus, there is an interest in further improving the properties of propylene polymers, particularly in improving the properties and/or processability.

BRIEF DESCRIPTION OF THE INVENTION

We have now discovered a process that allows producing propylene polymers with an improved combination of properties and processability.

Thus, the present invention relates to a process for the production of propylene copolymers comprising the step of polymerizing propylene and one or more comonomers in one or more polymerization reactors in presence of (a) a Ziegler-Natta catalyst comprising a titanium compound having at least one titanium-halogen bond, and a blend of a diether compound and a succinate compound as internal electron donor, both supported on a magnesium halide in active form, (b) an organoaluminium compound, preferably an Al-trialkyl, more preferably Al-triethyl, and (c) an optional external donor, characterized in that the weight ratio of diether compound to succinate compound is in the range from 0.01 to 100, preferably from 0.02 to 10, even more preferably from 0.05 to 5, and most preferably from 0.1 to 1.5.

In addition the present invention relates to a propylene polymer produced with such a process.

DETAILED DESCRIPTION OF THE INVENTION

For easier understanding the terms "diether catalyst" and "succinate catalyst" are used to denote a Ziegler-Natta catalyst with a diether compound as internal electron donor resp. a Ziegler-Natta catalyst with a succinate compound as internal electron donor.

The propylene polymers of the present invention can be copolymers of propylene and one or more comonomers, which can be ethylene or a $C_4$-$C_{20}$ alpha-olefin. The copolymers can be random copolymers or heterophasic copolymers.

The random copolymers of the present invention comprise at least 0.1 wt % of comonomer(s), preferably at least 0.2 wt %, more preferably at least 0.5 wt %, even more preferably at least 1 wt %, and most preferably at least 2 wt %. They comprise up to 10 wt % of comonomer(s), preferably up to 8 wt %, and most preferably up to 6 wt %. Preferably, the random copolymers are copolymers of propylene and ethylene.

The heterophasic copolymers of the present invention comprise a matrix, which in turn is made of propylene homopolymer or random copolymer as defined above, and a rubber phase. Preferably, the heterophasic copolymers are copolymers of propylene and ethylene. They have an ethylene content in the range from 4 wt % to 15 wt %. The heterophasic copolymers comprise from 5 wt % to 35 wt % of rubber phase. Preferably, the rubber phase is an ethylene propylene rubber.

The polymerization of propylene and one or more optional comonomers is performed in presence of one or more Ziegler-Natta catalysts, an organo-aluminium compound and an optional external donor.

A Ziegler-Natta catalyst comprises a titanium compound having at least one titanium-halogen bond, and an internal electron donor, both supported on magnesium halide in active form. For the present invention it is essential that the Ziegler-Natta catalyst comprises a blend of a diether compound and a succinate compound as internal electron donor. Preferably, the internal electron donor comprises only a blend of a diether compound and a succinate compound as internal electron donor. Such a catalyst can for example be obtained by reaction of an anhydrous magnesium halide with an alcohol, followed by titanation with a titanium halide and simultaneous reaction with a blend of a diether compound and a succinate compound as internal donor according to the methods described in patent applications WO 00/63261 and WO 02/100904. Such a catalyst comprises 2.5-7.5 wt % of titanium, about 10-20 wt % of magnesium and about 5-30 wt % of internal donor with chlorine and solvent making up the remainder.

Particularly suited diether compounds are 1,3-diethers of formula

wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP361493 and EP728769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl)fluorene.

Suitable succinate compounds have the formula

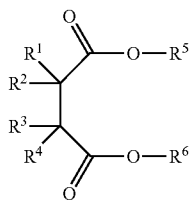

wherein $R^1$ to $R^4$ are equal to or different from one another and are hydrogen, or a C1-C20 linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

The organoaluminium compound is advantageously an Al-alkyl compound of the Al-trialkyls family, such as Al-triethyl, Al-trilsobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred. Advantageously, the Al-trialkyl has a hydride content, expressed as $AlH_3$, of less than 1.0 wt % with respect to the Al-trialkyl. More preferably, the hydride content is less than 0.5 wt %, and most preferably the hydride content is less than 0.1 wt %.

The organoaluminium compound is used in such an amount as to have a molar ratio Al/Ti in the range from 1 to 1000. Preferably, the upper limit is 500. More preferably, the upper limit is 400 The lower limit is preferably 10, more preferably 20, and most preferably 50.

Suitable external donors include certain silanes, ethers, esters, amines, ketones and heterocyclic compounds. It is preferred to use a 1,3-diether as described above or a silane. It is most preferred to use silanes of the general formula

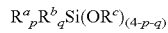

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different.

Specific examples of such silanes are $(tert\text{-}butyl)_2Si(OCH_3)_2$, (cyclohexyl)(methyl) $Si(OCH_3)_2$ (referred to as "C donor"), $(phenyl)_2Si(OCH_3)_2$ and $(cyclopentyl)_2 Si(OCH_3)_2$ (referred to as "D donor").

In the production of propylene copolymers the molar ratio of organo-aluminium compound to external donor ("Al/ED"), if present, ranges from 1 to 200. The upper limit of the Al/ED ratio preferably is at most 150, more preferably at most 100, even more preferably at most 80 and most preferably at most 65. The lower limit of the Al/ED ratio preferably is at least 3 and more preferably at least 5.

It has now been surprisingly found that the use of a Ziegler-Natta catalyst comprising a blend of a diether compound and a succinate compound as internal electron donor leads to a propylene polymer with improved properties and/or processability. In particular, the use of such a catalyst leads to copolymers of propylene and one or more comonomers with improved properties and/or processability.

For the present invention the internal electron donor blend has a weight ratio of diether compound to succinate compound in the range from 0.01 to 100. The upper limit of the weight ratio is preferably at most 10, more preferably at most 5, even more preferably at most 3, and most preferably at most 1.5. The lower limit of the weight ratio is preferably at least 0.02, more preferably at least 0.05, even more preferably at least 0.1 and most preferably at least 0.2.

The use of a Ziegler-Natta catalyst comprising both, diethyl-2,3-diisopropyl-succinate and 9,9-bis(methoxymethyl)fluorene for the homopolymerization of propylene is disclosed in WO 00/63261. However, except for the content of xylene insolubles, WO 00/63261 is silent on the properties of the obtained propylene homopolymer. WO 00/63261 is also silent regarding the use of such a catalyst for the copolymerization of propylene and one or more comonomers.

The polymerization of propylene and one or more optional comonomers can be carried out according to known techniques. The polymerization can for example be carried out in liquid propylene as reaction medium. It can also be carried out in a diluent, such as an inert hydrocarbon (slurry polymerization) or in the gas phase. For the production of heterophasic propylene copolymers the polymerization is preferably carried out in one or more polymerization reactors in series, employing liquid propylene as reaction medium and then in one or more gas phase reactors in series, as is done for example in a propylene polymer production line based on Spheripol technology. It is preferred to produce a heterophasic propylene copolymer sequentially in (a) one or more loop reactors and (b) one or more gas phase reactors. It is most preferred to employ only one gas phase reactor.

For the present invention propylene homopolymers and random copolymers are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence of the melt flow of the propylene polymer, is regulated by adding hydrogen.

Propylene polymers produced according to the present invention are characterized by a broad molecular weight distribution and a high isotacticity index. In fact, the present invention allows the production of bimodal propylene polymers in one single polymerization reactor. In particular propylene polymers with high melt flow index, i.e. low viscosity, show increased melt strength due to tailing in the high molecular weight fraction, thus allowing for better processability e.g. in extrusion applications. For the purposes of the present invention a bimodal propylene polymer, i.e. a propylene polymer having a bimodal molecular weight distribution, comprises two propylene polymer fractions whose molecular weights are different enough to be reproducibly separated by a suitable analytical method, for example by gel permeation chromatography (GPC).

Heterophasic propylene copolymers produced according to the present invention have a homo- or random copolymer matrix of broad or bimodal molecular weight distribution and, if applicable, a bimodal distribution of comonomer insertion and a rubber phase with a broad or bimodal molecular weight distribution and a bimodal distribution of comonomer insertion. The rubber phase can for example be an ethylene propylene rubber (EPR). With a constant volume ratio R in the feed streams to the polymerization reactor, i.e. R=C2 (vol %)/(C2(vol %)+C3(vol %)), of 0.42 the EPR resulting from diether as internal donor has 42.7 wt % of ethylene, the EPR resulting from succinate as internal donor has 47.1 wt % of ethylene. Without wishing to be bound by theory, this is attributed to the higher reactivity of a succinate catalyst towards ethylene as compared to a diether catalyst. In consequence, a succinate catalyst allows for the incorporation of a higher level of ethylene at a given ethylene concentration in the polymerization reactor. The resulting propylene polymer can be said to have bimodal ethylene distribution in the polymer chains. This behavior offers the additional advantage of allowing the production of a wider range of products on an existing polymerization plant. In particular, the present invention avoids having to use two gas-phase reactors, as is currently the case if a succinate compound is used as sole internal electron donor, for the production of an EPR phase so as to give a heterophasic copolymer with good stiffness/impact balance.

The propylene polymers made according to the present invention show improved flow, shrinkage and processing behavior.

The propylene polymer may contain additives such as, by way of example, antioxidants, light stabilizers, acid scavengers, lubricants, antistatic additives, nucleating/clarifying agents, colorants. An overview of such additives may be found in Plastics Additives Handbook, ed. H. Zweifel, 5$^{th}$ edition, 2001, Hanser Publishers.

The propylene polymers of the present invention can be used in extrusion applications and injection molding applications, particularly in film extrusion, fiber extrusion, sheet, injection molding, blow molding, extrusion stretch blow molding, thermoforming, etc.

The invention claimed is:

1. A process for the production of propylene copolymers comprising:
   polymerizing propylene and one or more comonomers in one or more loop reactors followed by a single gas polymerization reactor in the presence of:
   a Ziegler-Natta catalyst comprising a titanium compound having at least one titanium-halogen bond, and a blend of a diether compound and a succinate compound as internal electron donors, both supported on a magnesium halide in active form, an organoaluminium compound and an optional external donor, wherein a weight ratio of diether compound to succinate compound is at most 1.5;
   forming a propylene heterophasic copolymer.

2. The process of claim 1, wherein the propylene heterophasic copolymer is a bimodal propylene polymer.

3. The process of claim 2, wherein the propylene heterophasic copolymer has a bimodal ethylene distribution.

4. The process of claim 1, wherein the weight ratio of diether compound to succinate compound ranges from 0.1 to 1.5.

5. The process of claim 1, wherein the weight ratio of diether compound to succinate compound is at least 0.02.

6. The process of claim 1, wherein the weight ratio of diether compound to succinate compound is at least 0.05.

7. The process of claim 1, wherein the weight ratio of diether compound to succinate compound is at least 0.1.

8. The process of claim 1, wherein the weight ratio of diether compound to succinate compound is at least 0.2.

9. The process of claim 1, wherein a rubber phase of the propylene heterophasic copolymer has an ethylene content ranging from 4 wt % to 15 wt %.

10. A process for the production of propylene copolymers comprising:
    polymerizing propylene and one or more comonomers in the presence of:
    a Ziegler-Natta catalyst comprising a titanium compound having at least one titanium-halogen bond, and a blend of a diether compound and a succinate compound as internal electron donors, both supported on a magnesium halide in active form, an organoaluminium compound and an optional external donor, wherein a weight ratio of diether compound to succinate compound is at most 1.5;
    forming a propylene copolymer.

11. The process of claim 10, wherein the propylene copolymer is a propylene random copolymer.

12. The process of claim 10, wherein the propylene copolymer is a propylene heterophasic copolymer.

13. The process of claim 10, wherein the weight ratio of diether compound to succinate compound ranges from 0.1 to 1.5.

14. The process of claim 10, wherein the weight ratio of diether compound to succinate compound is at least 0.02.

15. The process of claim 10, wherein the weight ratio of diether compound to succinate compound is at least 0.05.

16. The process of claim 10, wherein the weight ratio of diether compound to succinate compound is at least 0.1.

17. The process of claim 10, wherein the weight ratio of diether compound to succinate compound is at least 0.2.

18. The process of claim 10, wherein the propylene copolymer is a propylene heterophasic copolymer comprising a rubber phase that has an ethylene content ranging from 4 wt % to 15 wt %.

* * * * *